(12) United States Patent
Beitia

(10) Patent No.: US 12,038,281 B2
(45) Date of Patent: Jul. 16, 2024

(54) GYROSCOPE

(71) Applicant: Innalabs Limited, Dublin (IE)

(72) Inventor: Jose Beitia, Dublin (IE)

(73) Assignee: Innalabs Limited, Dublin (IE)

( * ) Notice: Subject to any disclaimer, the term of this patent is extended or adjusted under 35 U.S.C. 154(b) by 0 days.

(21) Appl. No.: 17/263,589

(22) PCT Filed: Jul. 30, 2019

(86) PCT No.: PCT/EP2019/070545
§ 371 (c)(1),
(2) Date: Jan. 27, 2021

(87) PCT Pub. No.: WO2020/025636
PCT Pub. Date: Feb. 6, 2020

(65) Prior Publication Data
US 2021/0348923 A1    Nov. 11, 2021

(30) Foreign Application Priority Data
Jul. 30, 2018 (GB) ...................................... 1812364

(51) Int. Cl.
*G01C 19/5783* (2012.01)
*G01C 19/5677* (2012.01)
*G01C 19/5691* (2012.01)

(52) U.S. Cl.
CPC ..... *G01C 19/5677* (2013.01); *G01C 19/5783* (2013.01)

(58) Field of Classification Search
None
See application file for complete search history.

(56) References Cited

U.S. PATENT DOCUMENTS

| | | | | |
|---|---|---|---|---|
| 3,680,391 | A | * | 8/1972 | Denis ................. G01C 19/5691 73/504.13 |
| 2007/0113702 | A1 | * | 5/2007 | Braman .................. F16F 15/08 74/574.4 |

(Continued)

FOREIGN PATENT DOCUMENTS

| | | | | |
|---|---|---|---|---|
| CN | 105277184 A | * | 1/2016 | |
| DE | 3304849 C2 | * | 7/1991 | .............. B25F 5/006 |

(Continued)

OTHER PUBLICATIONS

Title: Locked Up RC; URL: https://www.lockeduprc.com/Silicone-Spacers_p_861.html; Date: Sep. 16, 2016 (Year: 2016).*

(Continued)

*Primary Examiner* — Jill E Culler
*Assistant Examiner* — Ruben C Parco, Jr.
(74) *Attorney, Agent, or Firm* — Bardmesser Law Group

(57) ABSTRACT

A gyroscope comprising a resonator, a plurality of transducers configured to drive a vibrational mode in the resonator and detect vibrations of the resonator, a base configured to support the resonator, the base including attachment points for attachment to an external system, and a vibration isolator for isolating the resonator from the external system, the vibration isolator being formed from resilient material and being located radially inward of the attachment points.

14 Claims, 4 Drawing Sheets

(56) References Cited

U.S. PATENT DOCUMENTS

| | | | |
|---|---|---|---|
| 2008/0184798 A1* | 8/2008 | Yatzenko | G01C 19/5691 |
| | | | 73/504.12 |
| 2010/0257932 A1* | 10/2010 | Braman | G01C 21/16 |
| | | | 73/493 |
| 2013/0192365 A1* | 8/2013 | Zhuang | G01C 19/5733 |
| | | | 73/504.12 |
| 2014/0085778 A1* | 3/2014 | Braman | B81B 7/0016 |
| | | | 361/679.01 |
| 2014/0102193 A1 | 4/2014 | Chikovani et al. | |
| 2016/0195396 A1 | 7/2016 | Sakuma | |
| 2017/0067759 A1* | 3/2017 | Braman | G01D 11/10 |

FOREIGN PATENT DOCUMENTS

| | | | | |
|---|---|---|---|---|
| DE | 102016122042 A1 * | 5/2017 | | B64G 1/288 |
| EP | 2672220 A2 | 12/2013 | | |
| EP | 3171131 A1 | 5/2017 | | |
| JP | H04236321 A | 8/1992 | | |
| JP | 2008190989 A | 8/2008 | | |
| KR | 10-2017-0096015 | 8/2017 | | |
| WO | WO-2012067534 A1 * | 5/2012 | | G01C 19/56 |

OTHER PUBLICATIONS

Search report in PCT/EP2019/070545, dated Feb. 2, 2021.
Search report in GB1812364.6, dated Jan. 24, 2019.
Office Action dated Dec. 13, 2022 in KR 10-2021-7005593.

* cited by examiner

GYROSCOPE

CROSS REFERENCE TO RELATED APPLICATIONS

This application is a US National Phase of PCT/EP2019/070545, filed on Jul. 30, 2019, which claims priority to UK Patent Application GB 1812364.6, filed on Jul. 30, 2018, both of which are incorporated herein by reference in their entirety.

BACKGROUND OF THE INVENTION

Field of the Invention

The present invention relates to a vibrating gyroscope.

Background of the Related Art

A gyroscope is a device which may be used to measure a rate of angular rotation. Measurements of the rate of angular rotation of the gyroscope may be integrated over time in order to determine a change in the angular orientation of the gyroscope. If an initial orientation of the gyroscope is known then a determination of a change in the angular orientation of the gyroscope may be used to derive the orientation of the gyroscope at a time after the change in the angular orientation. A gyroscope may, for example, be used in applications such as inertial measurement units (IMUs), platform stabilisation on grounds, aircraft, ships and/or other applications.

A vibrating gyroscope is a form of gyroscope in which a resonator is caused to vibrate. A vibrating gyroscope may be referred to as a vibrating structure gyroscope and/or a Coriolis vibrating gyroscope (CVG). A wide variety of resonators may be used to form a vibrating gyroscope including rings, cylinders, hemispheres, tuning forks and beams. Vibrating gyroscopes have many advantages over traditional gyroscopes (based on a spinning mass) and over gyroscopes based on fibre-optic and/or other optical technologies. For example, vibrating gyroscopes may be cheaper than fibre optic gyroscopes, and may be smaller and include fewer parts than spinning mass gyroscopes.

The accuracy of angular rotation measurements provided by a vibrating gyroscope will be reduced if shocks or vibrations from an external environment are transmitted to the vibrating gyroscope.

It is an object of the present invention to obviate or mitigate a disadvantage associated with known vibrating gyroscopes.

SUMMARY OF THE INVENTION

According to a first aspect of the invention there is provided a gyroscope comprising a resonator, a plurality of transducers configured to drive a vibrational mode in the resonator and detect vibrations of the resonator, a base configured to support the resonator, the base including attachment points for attachment to an external system, and a vibration isolator for isolating the resonator from the external system, the vibration isolator being formed from resilient material and being located radially inward of the attachment points.

An advantage of locating the vibration isolator radially inward from the attachment points is that this reduces the size of the gyroscope structure supported by the vibration isolator. This is important for aerial and space applications, and may in addition provide improved vibration isolation.

The resilient material may be provided in the base. The resilient material may be provided between inner and outer parts of the base. The resilient material may be generally frusto-conical. The base may have three outer parts which are angularly separated from each other by 120° relative to an axis which passes through a centre of the resonator.

The attachment points may comprise bores for receiving bolts. The resilient material may form at least part of a stem which supports the resonator. The resilient material may be fixed to the base. The resilient material may extend between a cylindrical projection which forms part of the base and a stem portion which extends from the resonator.

The resilient material may be rotationally symmetric. The resilient material may be axially symmetric.

The resilient material may be an elastomer. The resonator may have a cylindrical, hemispherical or toroidal shape. The resonator may have a mushroom configuration with a stem which is located at least partially within the resonator.

The vibration isolator may have a cut-off frequency which is less than 20% of the frequency of primary and secondary modes of the resonator. The vibration isolator may have a cut-off frequency which is around 10% or less of the frequency of primary and secondary modes of the resonator. The gyroscope may further comprise rods which pass through the base and pass through openings in the resonator, the rods being configured to carry electrical signals to and from the transducers. The rods may be connected to an electronics board provided in the base of the gyroscope.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF EMBODIMENTS OF THE INVENTION

Reference will now be made in detail to the preferred embodiments of the present invention, examples of which are illustrated in the accompanying drawings.

Figure 1A:
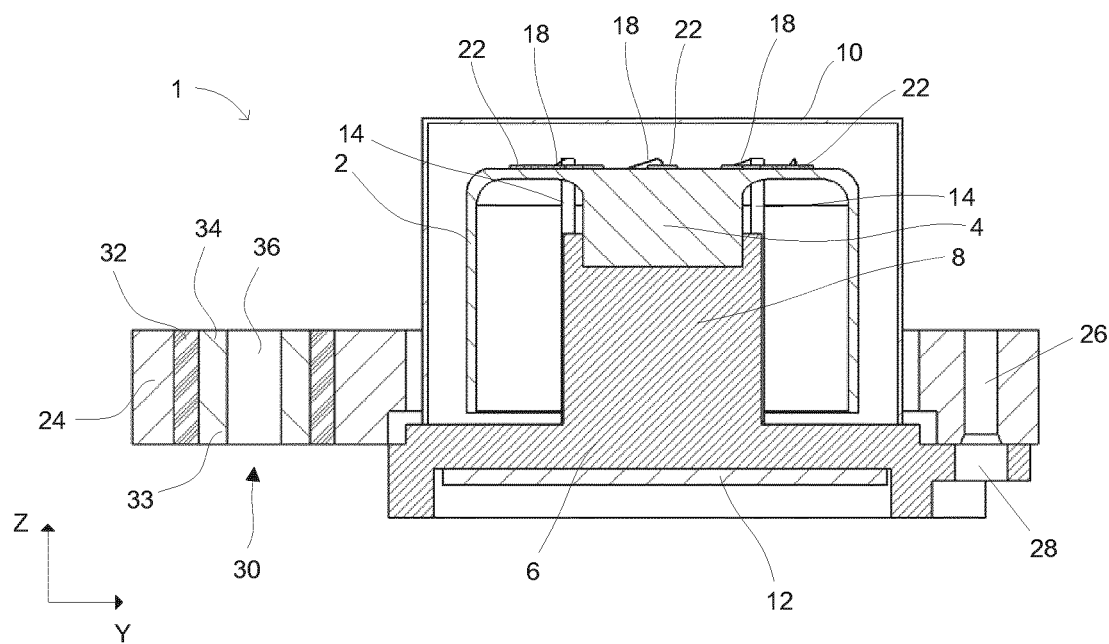
FIGS. 1A and 1B depict a known gyroscope.
Figure 1B:
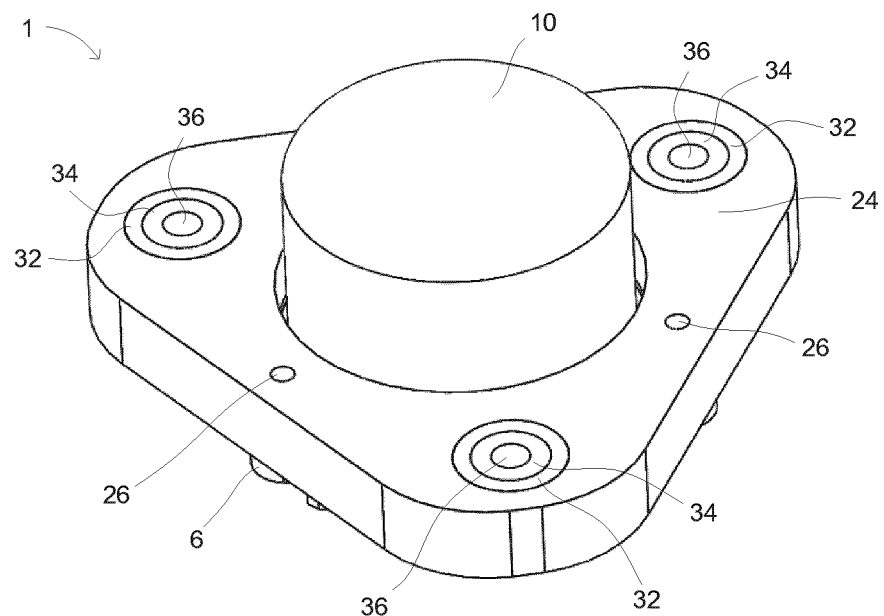

FIG. 1 depicts a known vibrating gyroscope 1, the gyroscope being depicted in cross-section in FIG. 1A and in perspective view in FIG. 1B.

The gyroscope 1 includes a resonator 2 which has a generally cylindrical shape. The resonator 2 is connected to a stem 4 which secured in a base 6. The base 6 includes a cylindrical projection 8 provided with a recess at its upper end, the recess being configured to receive the stem 4 of the resonator 2. The resonator 2 is covered by a cap 10 which allows pressure conditions to be controlled inside a volume enclosed by the cap 10 and the base 6. For example, a vacuum may be maintained inside the volume.

An electronics board 12 is positioned in a recess formed in a bottom surface of the base 6. Rods 14 extend from the electronics board 12 through holes in the base 6. The rods 14 extend upwards and through holes in the resonator 2. Due to the plane of the cross-section of the gyroscope 1, the rods 14 are partially obscured by the cylindrical projection 8, and the holes in the base 6 and the resonator 2 are not visible. A gas-tight electrically insulating seal (e.g. formed from quartz) is provided between each hole in the base 6 and the rod 14 which passes through that hole. This allows a vacuum established in the volume between the cap 10 and the base 6 to be maintained.

Wires 18 extend from the rods 14 to transducers 22 which are positioned on the resonator 2. Electrical signals are sent from the electronics board 12 in the base 6 via the rods 14 to the transducers 22. Electrical signals are also sent in the opposite direction (from the transducers 22 to the electronics board 12 in the base 6). The electronics board 12 comprises one or more amplifiers which are configured to amplify electrical signals. Electrical signals pass from the electronics board 12 via wires (not depicted) to and from external control electronics (not depicted).

The transducers 22 are mechanically coupled to the resonator 2 (e.g. bonded to the resonator). As will be described in further detail below, some of the transducers 22 are used to actuate the resonator 2 in response to electronic signals provided to the transducers 22, so as to excite a vibrational mode in the resonator. Some of the transducers 22 are used to measure vibrations of the resonator 2 and output electronic signals which indicate the measured vibrations.

The base 6 is connected to a support structure 24 which in turn is connected to an external system (not depicted). In use, the gyroscope 1 will measure the rate of angular rotation of the external system. The support structure 24 includes three bores 26, one of which is visible in FIG. 1A. Three bores 28 are provided in the base 6, one of which is visible in FIG. 1A. Bolts (not depicted) pass through the bores 26, 28 to secure the support structure 24 to the base 6. The bores 26 in the support structure 24 (and corresponding bores 28 in the base) are angularly separated from each other by 120° relative to an axis which passes through the centre of the resonator 2.

The support structure 24 is provided with three openings 30, one of which can be seen in FIG. 1A. A cylinder of resilient material 32, which may be referred to as a damper 32, is provided in each opening. A cylinder of rigid material, e.g. metal, is provided in each damper 32. The cylinder of rigid material may be referred to as an insert 34. The insert 34 includes a bore 36 for receiving a bolt (not depicted). All three dampers 32 and inserts 34 are visible in FIG. 1B. The dampers 32 taken together may be considered to be a vibration isolator.

Bolts (not depicted) pass through the bores 36 in the inserts 34 and into the external system (not depicted). As will be appreciated from FIG. 1B, three bolts connect the support structure 24, via the inserts 34, to the external system. As may be seen from FIG. 1B, the positions at which the bolts are provided are angularly separated from each other by 120° relative to an axis which passes through the centre of the resonator 2. The bores 36 may be referred to as attachment points. The dampers 32 surround these attachment points.

The dampers 32 provide some isolation of the resonator 2 from vibrations of the external system. However, perfect isolation from the external system is not possible in practice and some vibrations from the external system will be transmitted to the resonator 2.

Cartesian coordinates are included on FIGS. 1A and 1*n* other subsequent figures, with the Z-direction corresponding with an axis (not depicted) which extends through the centre of the resonator 2. The Cartesian coordinates are included to facilitate description of the illustrated embodiments, and are not intended to imply that the depicted gyroscopes must have a particular orientation.

Further details of the structure of a gyroscope of the type which is shown in FIG. 1 are disclosed by published U.S. Pat. No. 9,322,655 which is hereby incorporated by reference in its entirety. U.S. Pat. No. 9,322,655 also discloses other configurations of gyroscopes which may be used in conjunction with the present invention.

Figure 2A:
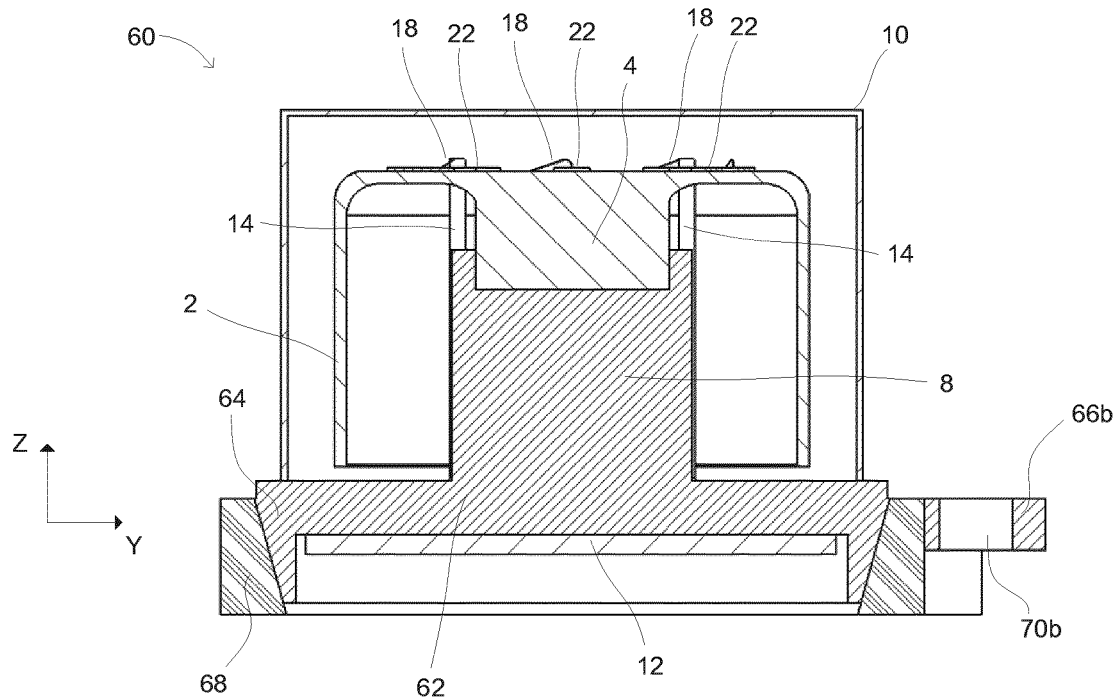
FIGS. 2A and 2B depict a gyroscope according to a first embodiment of the invention.
Figure 2B:
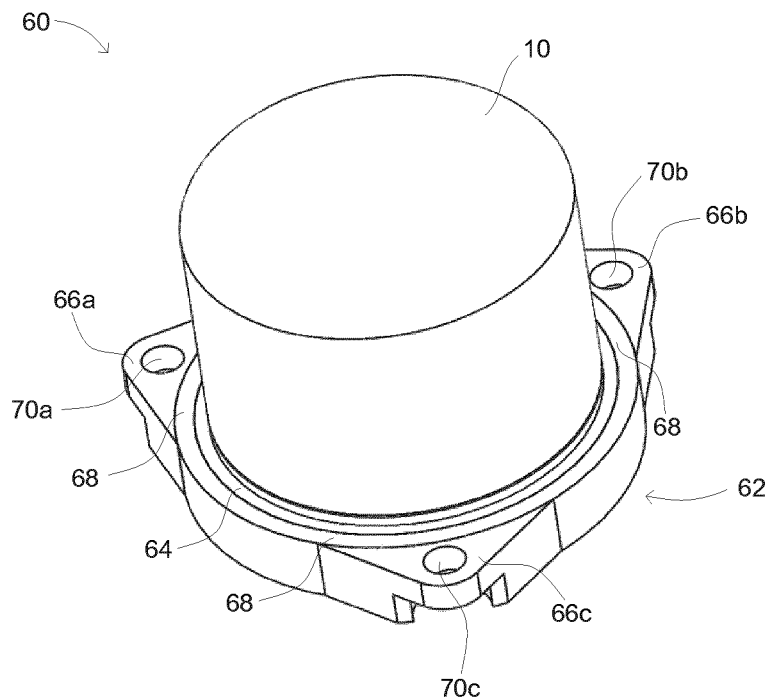

FIG. 2 depicts a gyroscope 60 according to a first embodiment of the invention. FIG. 2A depicts the gyroscope in cross section and FIG. 2B is a perspective view of the gyroscope. Many features of the gyroscope depicted in FIG. 2 correspond with those depicted in FIG. 1. Where this is the case common reference numerals have been used and the features are not described again with reference to FIG. 2. In brief, the gyroscope comprises a resonator 2 and stem 4, the stem being received in a cup shaped projection 8 which extends from a base 62. The base 62 has a different structure from the base depicted in FIG. 1 and is described in detail further below. The gyroscope further comprises a cap 10, circuit board 12, and rods 14 which extend through holes in the base 62 and in the resonator 2. Wires 18 connect the rods 14 to transducers 22 provided on the resonator. The transducers 22 are configured to excite the vibrations of the resonator 2 and to detect vibrations of the resonator (as explained further below).

The base 62 is configured for direct connection to an external system (not depicted) instead of being configured for connection via a support structure 24 (as is the case with the gyroscope depicted in FIG. 1). The base 62 comprises an inner part 64 and three outer parts 66*a*-*c*. The outer parts 66*a*-*c* of the base are angularly separated from each other by 120° relative to an axis which passes through the centre of the resonator 2. The inner part 64 and outer parts 66*a*-*c* may be formed from metal (e.g. steel). The metal may be same metal as is used to form other parts of the gyroscope 60 such as the resonator 2 and the cap 10 (e.g. steel). Forming the base and other parts using the same metal is advantageous because those parts then all have the same thermal expansion coefficient.

A vibration isolator comprising a layer of resilient material 68 is provided in the base between the inner part 64 and each outer part 66*a*-*c* of the base. The layer of resilient material 68 may be referred to as a damper. The resilient material may for example be an elastomer. The resilient material may be heat treated such that it bonds to the inner part 64 of the base and bonds to the outer parts 66*a*-*c* of the base. Each outer part 66*a*-*c* of the base 62 is provided with a bore 70*a*-*c*. The bores 70*a*-*c* each receive a bolt (not depicted) which secures the base 62 to the external system (not depicted). The bores 70a-c may be referred to as attachment points, since it is via the bores that the gyroscope 80 is attached to the external system. The damper 68 isolates the resonator from vibrations of the external system. The damper 68 is located radially inward of the bores 70a-c.

The embodiment of the invention depicted in FIG. 2 has various advantages over the prior art gyroscope depicted at FIG. 1. The volume of space occupied by the gyroscope 60 is reduced. This is valuable because very limited space may be available in the external system to which the gyroscope is attached (for example if the external system is an aircraft or space-going craft such as a satellite). In addition, the weight of the gyroscope 60 is reduced because it comprises less material. This is particularly advantageous if the external system is a space-going craft.

Although the layer of resilient material 68 will not fully prevent external vibrations being transmitted from the external system to the resonator 2, the transmission of such vibrations is better controlled. This allows the design of the gyroscope 60 to be tailored to take account of modelled transmitted vibrations (as explained below).

An outer perimeter of the inner part 64 of the base 62 is generally frusto-conical. The layer of resilient material 68 is also generally frusto-conical, and inner faces of the base outer parts 66a-c are also generally frusto-conical. This provides a damped frusto-conical connection between the base inner part 64 and the external system. The frusto-conical connection is advantageous because it limits the modes of vibration that can pass from the external system to the resonator 2. The term "generally frusto-conical" is intended to encompass shapes which comprise a section of a frusto-cone. The layer of resilient material is rotationally symmetric.

Because the damper 68 has a frusto-conical inner surface, the damper provides damping both in and out of plane vibration inputs. In this context the term in-plane refers to vibration inputs in the XY plane and out of plane refers to vibration inputs in the Z direction.

The damper 68 may have a cut-off frequency which is selected to be well below the frequency of primary and secondary vibration modes of the resonator 2 (primary and secondary modes are discussed further below). The cut-off frequency may be less than 20% of the frequency of the primary and secondary modes. The cut-off frequency may be around 10% or less of the frequency of the primary and secondary modes. In an embodiment the primary and secondary modes may have a frequency of around 6 kHz. The damper may have a cut-off frequency of around 600 Hz. Where this is the case, the gyroscope 60 may have a useable bandwidth of up to around 300 Hz. That is, rotations of the external structure of up to 300 Hz are transmitted via the damper 68 to the resonator 2 with negligible lag and can thus be measured accurately by the gyroscope 60. The cut-off frequency may be selected by selecting the thickness and stiffness of the resilient material layer 68 which forms the damper. If the resilient material layer 68 is made thinner, then the cut-off frequency is increased. Conversely, if the resilient material layer is made thicker then the cut-off frequency is reduced. Similarly, using a stiffer resilient material raises the cut-off frequency whereas using a softer resilient material lowers the cut-off frequency.

The cut-off frequency of the damper 68 may be selected such that shocks with low frequency spectral content (e.g. below 300 Hz) are transmitted while higher frequency (e.g. 600 Hz or above), larger shocks are significantly attenuated, particularly for frequencies which are close to the frequencies of the primary and secondary modes. This enables the gyroscope to operate under more demanding shock and vibration conditions than would otherwise to possible without the damper 68.

The structure supported by the damper 68 of the embodiment of FIG. 2 is significantly smaller than the structure supported by the damper 32 of the prior art gyroscope of FIG. 1. As noted above this is advantageous because the embodiment needs less space than the prior art gyroscope and is lighter. In addition, the damper 68 of the embodiment provides more effective damping than the damper 32 of the prior art gyroscope. In general, less unwanted vibration modes of the embodiment will be excited than will be excited in the prior art gyroscope.

Figure 3A:
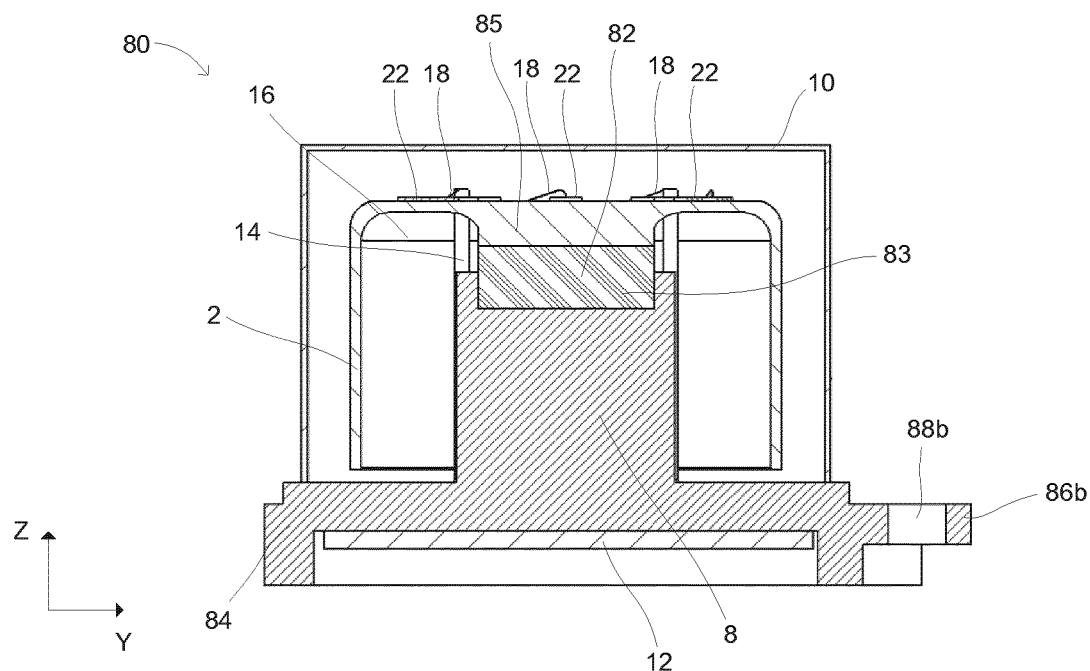
FIGS. 3A and 3B depict a gyroscope according to a second embodiment of the invention.
Figure 3B:
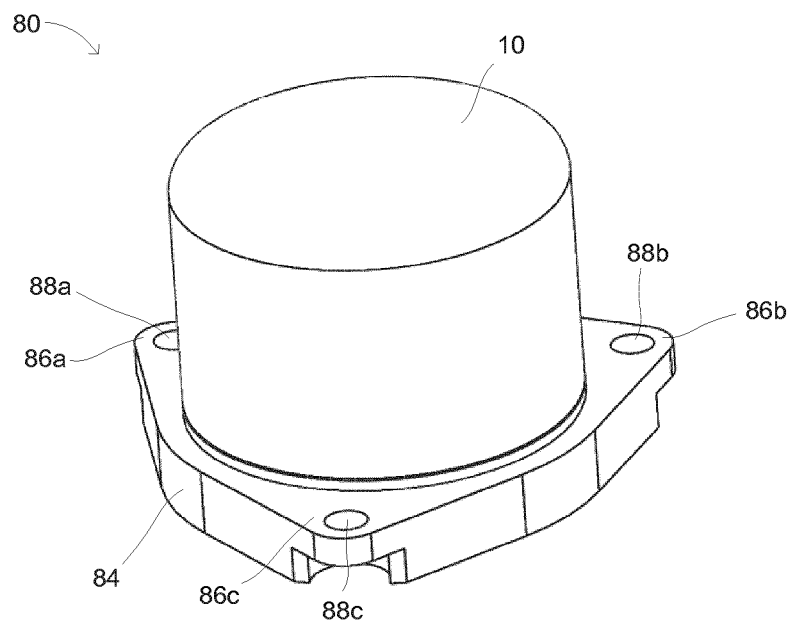

FIG. 3 depicts a gyroscope 80 according to a further embodiment of the invention. FIG. 3A depicts the gyroscope in cross section and FIG. 3B is a perspective view of the gyroscope. Many features of the gyroscope depicted in FIG. 3 correspond with those depicted in FIGS. 1 and 2. Where this is the case common reference numerals have been used and the features are not described again with reference to FIG. 3. In brief, the gyroscope comprises a resonator 2 and stem 82, the stem being received in a recess provided in a cylindrical projection 8 which extends from a base 84. The stem 82 and base 84 have a different structure from the base depicted in FIG. 1, and this is described in detail further below. The gyroscope further comprises a cap 10, circuit board 12, rods 14 which extend through holes in the base 84 and holes in the resonator 2, and wires 18 which connect the rods to transducers 22. The transducers 22 are provided on the resonator 2 and are configured to excite vibrations of the resonator 2 and to detect vibrations of the resonator (as explained further below).

The base 84 is configured for direct connection to an external system (not depicted) instead of being configured for connection via a support structure 24 (as is the case with the gyroscope depicted in FIG. 1). The base 84 includes three lateral projections 86a-c. Each lateral projection is provided with a bore 88a-c. The projections 86a-c of the base are angularly separated from each other by 120° relative to an axis which passes through the centre of the resonator 2. The bores 88a-c each receive a bolt (not depicted) which secures the base 84 to the external system (not depicted). The bores 88a-c may be referred to as attachment points, since it is via the bores that the gyroscope 80 is attached to the external system.

The stem 82 includes a portion 83 which is formed from resilient material. The resilient stem portion 83 is a vibration isolator (and may be referred to as a damper 83). The resilient material may for example be an elastomer. One end of the resilient stem portion 83 is fixed to the base 84. The end of the resilient stem portion 83 is held within the recess in the cylindrical projection 8 of the base 84. An opposite end of the resilient stem portion is secured to a stem portion 85 which extends from the resonator 2 and which may be integrally formed with the resonator 2 (i.e. formed from the same piece of material). The stem portion 85 which extends from the resonator 2 may be referred to as the resonator stem portion 85. The resilient stem portion 83 may be heat treated such that it bonds to the cylindrical projection 8 of the base 84 and bonds to the resonator stem portion 85. The resilient stem portion 83 isolates the resonator 2 from vibrations of the external system. Connection to the external system is via the bores 88a-c which are located radially outward of the resilient stem portion 83. In other words, the damper The damper 83 is located radially inward of the bores 88a-c.

The embodiment of the invention depicted in FIG. 3 has various advantages over the prior art gyroscope depicted at FIG. 1. The volume of space occupied by the gyroscope 80 is reduced and the weight of the gyroscope is reduced. This is advantageous for aircraft and space-going craft (as explained further above).

In common with the embodiment depicted in FIG. 2, the resilient stem portion 83 will not fully prevent external vibrations being transmitted from the external system to the resonator 2. However, the transmission of such vibrations is better controlled and is more easily modelled than in the embodiment of FIG. 2. This is partially because the resilient stem portion 83 (which may be referred to as a damper) is rotationally symmetric, and is partially because the structure which is supported by the resilient stem portion is smaller and simpler than the structure that is supported by the damper 68 of the FIG. 2 embodiment. In general, less unwanted vibration modes of the embodiment will be excited than will be excited in the prior art gyroscope.

In the depicted embodiment the resilient stem portion 83 extends from the base 84 and is fixed to the base. In other embodiments, the resilient stem portion 83 may be located part way up the stem, with a non-resilient portion fixed to the base and a further no-resilient portion extending from the resonator. In other embodiments the entire stem may be formed from resilient material. In general, at least part of the stem may be formed from resilient material.

The damper 83 may have a cut-off frequency which is selected to be well below the frequency of primary and secondary vibration modes of the resonator 2. The cut-off frequency may be less than 20% of the frequency of the primary and secondary modes. The cut-off frequency may be around 10% or less of the frequency of the primary and secondary modes. In an embodiment the primary and secondary modes may have a frequency of around 6 kHz. The damper 82 may have a cut-off frequency of around 600 Hz. Where this is the case, the gyroscope 60 may have a useable bandwidth of up to around 300 Hz. That is, rotations of the external structure of up to 300 Hz are transmitted via the damper 83 to the resonator 2 with negligible lag and can thus be measured accurately by the gyroscope 60. The cut-off frequency may be selected by selecting the thickness of the resilient stem portion 83 (as measured in the direction of a central axis of the gyroscope), and by selecting the stiffness of the resilient material which forms the resilient stem portion. If the resilient stem portion 83 is made thinner, then the cut-off frequency is increased. Conversely, if the resilient stem 83 portion is made thicker then the cut-off frequency is reduced. Similarly, the cut-off frequency may be selected by selecting the stiffness of the material used to make the resilient stem portion 83. Using a stiffer resilient material raises the cut-off frequency whereas using a softer resilient material lowers the cut-off frequency.

Figure 4:
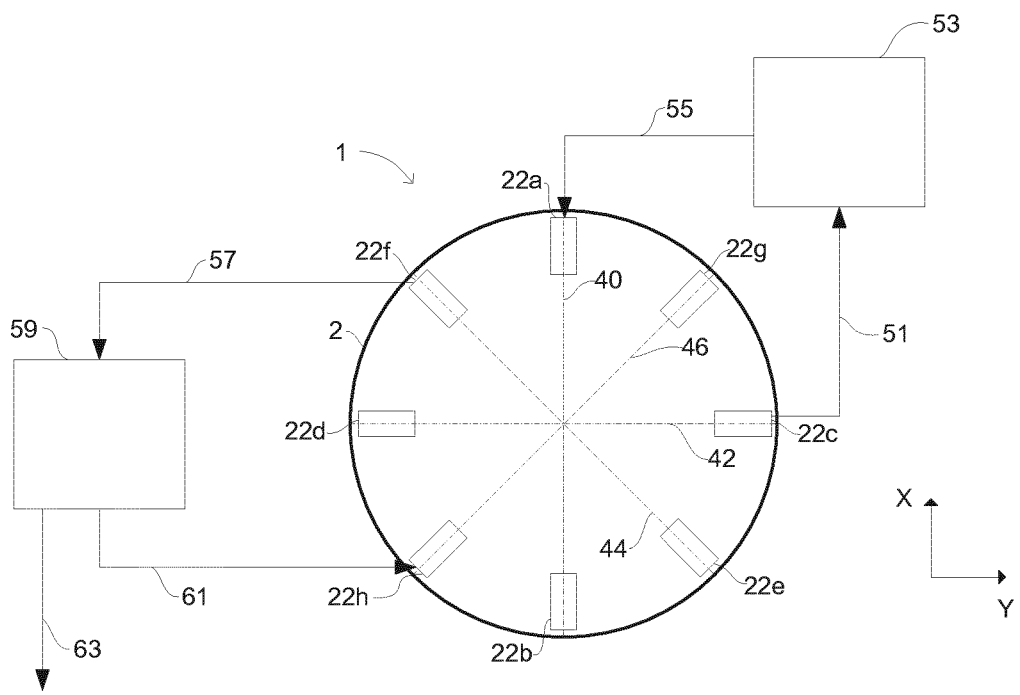
FIG. 4 is a schematic illustration of a resonator of the gyroscope of FIGS. 2 and 3.
Figure 5:
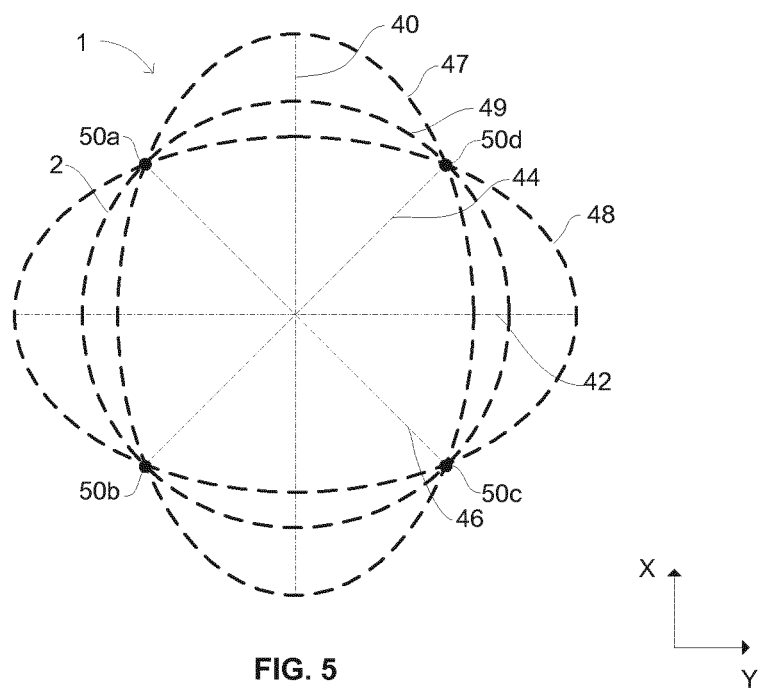
FIG. 5 is a schematic illustration of the resonator of FIGS. 2 and 3 at different positions during a vibration.

FIGS. 4 and 5 schematically depict the resonator 2 of the gyroscope 60, 80 of embodiments of the invention as viewed from above. Positioned on the resonator 2 are eight transducers 22a-22h. For ease of illustration no holes are shown in the resonator 2 in FIG. 4. However it will be appreciated that electrical connections are provided to each of the transducers 22a-22h in order to provide and/or receive signals to and/or from the transducers 22a-22h. The electrical connections may extend through holes in the resonator (not shown in FIG. 4). The transducers 22a-22h are arranged around the resonator 2 such that the angular separation between adjacent transducers is approximately 45°. The transducers 22a-22h are mechanically coupled to the upper surface of the resonator 2 (e.g. by bonding). The transducers 22a-22h comprise piezoelectric materials in which mechanical stress is converted to electrical signals and vice versa.

A pair of primary drive transducers 22a and 22b are arranged at opposite ends of a primary drive axis 40 which extends across the resonator 2. A pair of primary detection transducers 22c and 22d are arranged at opposite ends of a primary detection axis 42. The primary detection axis 42 forms an angle of 90° with the primary drive axis 40. A pair of secondary detection transducers 22e and 22f are arranged at opposite ends of a secondary detection axis 44. The secondary detection axis 44 forms an angle of 45° with both the primary drive axis 40 and the primary detection axis 42. A pair of secondary drive transducers 22g and 22h are positioned at opposite ends of a secondary drive axis 46. The secondary drive axis 46 forms an angle of 90° with the secondary detection axis 44 and forms an angle of 45° with both the primary drive axis 42 and the primary detection axis 40.

The primary drive transducers 22a, 22b are configured to actuate the resonator 2 so as to drive vibrations along the primary drive axis 21. FIG. 5 is a schematic depiction of the resonator 2 at different positions during a vibration which is driven along the primary drive axis 21. For ease of illustration the transducers 22a-22h are omitted from FIG. 5. The primary drive transducers 22a, 22b apply forces to the resonator 2 such that the resonator 2 oscillates between a first position 47 in which the resonator 2 is elongated into an ellipse whose semi-major axis is substantially aligned with the primary drive axis 40 and a second position 48 in which the resonator 2 is elongated into an ellipse whose semi-major axis is substantially aligned with the primary detection axis 42. It will be appreciated that during the oscillation, the resonator 2 transitions through a third position 49 which is the position which the resonator 2 relaxes to when the resonator 2 is not forced to vibrate.

If the vibrating gyroscope 1 is stationary then the vibrations of the resonator 2 are such that there are four nodes 50a-50d at which the resonator 2 is substantially stationary. The nodes 50a-50d are substantially positioned on the secondary detection axis 44 and the secondary drive axis 46. The points at which the resonator 2 intersects the primary drive axis 40 and the primary detection axis 42 may be referred to as antinodes since these points represent points at which the amplitude of the vibration of the resonator 2 is at a maximum.

When the gyroscope 1 undergoes a rotation the primary drive axis 40 rotates and the vibrations in the resonator 2 are driven (by the primary drive transducers 22a, 22b) along a different direction to the direction in which they were driven prior to the rotation. However, the vibrations in the resonator 2 have an inertia which causes vibrations to persist in the same direction as the direction in which the vibrations were occurring before the gyroscope 1 rotated. The vibrations in the resonator 2 rotate with the rotation of the gyroscope 1, however the inertia of the vibrations causes the rotation of the vibrations to lag behind the rotation of the gyroscope 1. A rotation of the gyroscope 1 therefore causes vibrations to occur in directions which are not aligned with the primary drive axis 40 or the primary detection axis 42. If no force is applied to the nodes 50a-50d then this effect causes a movement of the resonator 2 to be induced at the nodes 50a-50d.

In order to measure the rotation rate of the gyroscope 1, the secondary drive transducers 22g, 22h may act to null the nodes 50a-50d such that substantially no displacement of the resonator 2 occurs at the nodes 50a-50d. As will be described further below the force which is applied in order to null the nodes 50*a*-50*d* is directly proportional to the rate of rotation of the gyroscope 1 and thus measurement of this force may be used to measure the rate of rotation of the gyroscope 1.

In an alternative measurement system, instead of nulling nodes the position of the vibration of the resonator is measured directly. The measured position of the vibration may be used to determine the rotation of the gyroscope. This may be referred to as an open loop system. Embodiments of the invention may use this alternative measurement system or any other measurement system.

As was described above the primary drive transducers 22*a*, 22*b* are configured to actuate the resonator 2 so as to excite a vibrational mode in the resonator 2. The vibrational mode which is excited by the primary drive transducers 22*a*, 22*b* may be referred to as a primary vibrational mode. The primary vibrational mode consists of vibrations along the primary drive axis 40 and the primary detection axis 42 as shown in FIG. 5. The primary detection transducers 22*c*, 22*d* are configured to detect the vibrations of the resonator 2 along the primary detection axis 42. Motion of the resonator 2 induces a mechanical stress in the primary detection transducers 22*c*, 22*d*. The mechanical stress induces a charge flow within a piezoelectric material which forms the transducers 22*c*, 22*d*, thereby generating an electrical signal. The electrical signal is output from the primary detection transducers as a primary detection signal 51. The primary detection signal 51 corresponds to the vibrations of the resonator 2 along the primary detection axis 42.

The primary detection signal 51 is input to a primary feedback loop 53 as shown in FIG. 4. The primary feedback loop 53 outputs a primary drive signal 55 which forms an input to the primary drive transducers 22*a*, 22*b*. The primary drive signal 55 is an electrical signal which induces a strain in a piezoelectric material which forms the transducers 22*c*, 22*d*. The strain in the piezoelectric material is transferred to the resonator 2 and induces motion of the resonator which corresponds to the primary drive signal 55.

For ease of illustration the primary detection signal 51 is only shown in FIG. 4 as originating from the transducer 22*c* and the primary drive signal is only shown as being input to the transducer 22*a*. However it will be appreciated that in practice both of the primary detection transducers 22*c*, 22*d* contribute to the primary detection signal 51 and the primary drive signal 55 is input to both of the primary drive transducers 22*a*, 22*b*.

The primary feedback loop 53 controls the primary drive transducers 22*a*, 14*b* based on measurements made by the primary detection transducers 22*c*, 14*d*. The primary feedback loop 53 comprises a phase locked loop and an automatic gain control loop (not shown). The phase locked loop is configured to ensure that the frequency of the primary vibration mode which is driven by the primary drive transducers 22*a*, 14*b* remains at a resonant frequency of the resonator 2. The amplitude gain control loop is configured to ensure that the amplitude of the primary vibration mode remains at a desired amplitude. If the amplitude and/or the frequency of the primary vibration mode deviates from the desired amplitude and the resonant frequency then the primary feedback loop 53 acts to control the primary drive transducers so as to correct for any such deviation.

As was explained above rotation of the gyroscope 1 will cause vibrations to occur in directions which are not aligned with the primary drive axis 40 or the primary detection axis 42. In particular vibrations occur along the secondary detection axis 44. Vibrations along the secondary detection axis 44 may be referred to as a secondary vibration mode. Motion of the resonator 2 along the secondary detection axis 44 induces a mechanical stress in the secondary detection transducers 22*e*, 22*f*. The mechanical stress induces a charge flow within piezoelectric materials which form the transducers 22*e*, 22*f*, thereby generating an electrical signal. The electrical signal is output from the secondary detection transducers as a secondary detection signal 57. The secondary detection signal 57 corresponds to the vibrations of the resonator 2 along the secondary detection axis 44.

The secondary detection signal 57 is input to a secondary feedback loop 59 as shown in FIG. 4. The secondary feedback loop 59 outputs a secondary drive signal 61 which forms an input to the secondary drive transducers 22*h*, 22*g*. The secondary drive signal 61 is an electrical signal which induces a strain in piezoelectric materials which form the secondary drive transducers 22*h*, 22*g*.

For ease of illustration the secondary detection signal 57 is only shown in FIG. 4 as originating from the transducer 22*f* and the secondary drive signal 61 is only shown as being input to the transducer 22*h*. However it will be appreciated that in practice both of the secondary detection transducers 22*e*, 22*f* contribute to the secondary detection signal 57 and the secondary drive signal 61 is input to both of the secondary drive transducers 22*g*, 22*h*.

The primary feedback loop 53, the secondary feedback loop 59 and connections between the feedback loops 53, 59 and the transducers 22 are only shown schematically in FIG. 4. In practice the primary feedback loop 53 and the secondary feedback loop 59 may comprise analogue and/or digital electronics which may be located on one or more electronics boards (not shown in FIG. 4). The one or more electronics boards may, for example, comprise the electronics board 12 positioned in the base 6 of the gyroscope 1 as depicted in FIG. 1. Alternatively the primary feedback loop 53 and the secondary feedback loop 59 may be positioned elsewhere and may be separate from the base of the gyroscope.

The secondary feedback loop 59 controls the secondary drive transducers 22*g*, 22*h* based on measurements made by the secondary detection transducers 22*e*, 22*f*. The secondary feedback loop 59 is configured to output a secondary drive signal 61 which causes the secondary drive transducers 22*g*, 22*h* to null the secondary vibration mode such that substantially no vibrations occur along the secondary detection axis 23 or the secondary drive axis 44.

The secondary feedback loop 59 also outputs a measurement signal 63 which is proportional to the rate of rotation of the gyroscope 1. The gyroscope 1 has a scale factor SF which is a proportionality constant that relates the measurement signal 63 which is output from the secondary feedback loop 59 to the rate of rotation of the gyroscope 1. The scale factor SF is typically defined as the voltage of the measurement signal 63 per unit of rate of rotation of the gyroscope 1 (typically given in units of volts per degree per second).

The scale factor SF depends on the gain $G_{SDr}$ of the secondary drive transducers 22*g*, 22*h*, the gain $G_{PDe}$ of the primary detection transducers and a reference amplitude $V_{ref}$. The reference amplitude $V_{ref}$ is a target amplitude of the primary vibration mode and remains constant with time and temperature. The scale factor SF is given by:

$$SF = k \frac{V_{ref}}{G_{PDe} G_{SDr}} \quad (1)$$

where k is a proportionality constant. In order to determine the rate of rotation of the gyroscope 1 knowledge of the scale factor SF is required. The scale factor SF may be determined through a calibration process.

As explained in the above description, the measurement of angular rotation uses vibration modes of the resonator 2 which are referred to as the primary and secondary vibration modes. Other undesired vibration modes may be excited. However, the damper 68, 83 of embodiments of the invention may reduce excitation of undesired vibration modes. Less undesired vibration modes may be excited than are excited in the prior art gyroscope.

The vibration isolator (or damper) may have a configuration which differs from the illustrated embodiments. In general, the resilient material which forms the vibration isolator may be located in the base or form part of the stem. The resilient material may be provided in a form which is rotationally symmetric (and may be axially symmetric). This symmetry is advantageous because it maintains the symmetry between the pair of operating modes described above, and also avoids generating unwanted parasitic modes that would be generated if the resilient material was not symmetric.

In other embodiments the resonator 2 may be shaped differently than is shown in for the first and second embodiments. For example, the resonator 2 may have a hemispherical or toroidal shape.

In the depicted embodiments the resonator 2 has a mushroom configuration with the stem 4, 82 being located at least partially within the resonator. Other embodiments of the invention may also have a mushroom configuration. Other embodiments of the invention may have an inverted resonator such that the stem extends from an opposite side of the resonator. However, such embodiments suffer from the disadvantage that they are less compact than embodiments which have a mushroom configuration.

The resonator 2 may be formed from a range of different materials. For example, the resonator 2 may comprise a metal, or fused quartz (which may be called fused silica). Non-resilient parts of the gyroscope may for example be made from metal or fused quartz (fused silica).

Whilst the invention has been described with reference to specific embodiments of a gyroscope, it will be appreciated that the invention may be used with other configurations of vibrating gyroscope. For example, the invention may be used in connection with a hemispherical resonant gyroscope or a double tuning fork resonant gyroscope.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

The invention claimed is:

1. A gyroscope comprising:
a resonator;
a plurality of transducers configured to drive a vibrational mode in the resonator and detect vibrations of the resonator;
a base configured to support the resonator, the base including attachment points for attachment to an external system;
a vibration isolator for isolating the resonator from the external system, the vibration isolator being formed from a resilient material and being located radially inward of the attachment points; and
rods which pass through the base and pass through openings in the resonator, the rods being configured to carry electrical signals to and from the transducers,
wherein the resilient material is an elastomer, and
wherein the resilient material is a ring of a trapezoidal cross-section, such that the trapezoidal cross-section of the ring widens in a direction downward from the transducers, and
wherein the trapezoidal cross-section of the ring abuts a portion of the base that is frusto-conical, the portion of the base narrowing in the direction downward from the transducers.

2. The gyroscope of claim 1, wherein the resilient material is provided in the base.

3. The gyroscope of claim 2, wherein the resilient material is provided between inner and outer parts of the base.

4. The gyroscope of claim 1, wherein the base has three outer parts which are angularly separated from each other by 120° relative to an axis which passes through a centre of the resonator.

5. The gyroscope of claim 1, wherein the attachment points comprise bores for receiving bolts.

6. The gyroscope of claim 1, wherein the resilient material is rotationally symmetric.

7. The gyroscope of claim 1, wherein the resilient material is axially symmetric.

8. The gyroscope of claim 1, wherein the resonator has a cylindrical shape.

9. The gyroscope of claim 8, wherein the resonator has a mushroom configuration with a stem which is located at least partially within the resonator.

10. The gyroscope of claim 1, wherein the vibration isolator has a cut-off frequency which is less than 20% of the frequency of primary and secondary modes of the resonator.

11. The gyroscope of claim 10, wherein the vibration isolator has a cut-off frequency which is around 10% or less of the frequency of primary and secondary modes of the resonator.

12. The gyroscope of claim 1, wherein the rods are connected to an electronics board provided in the base of the gyroscope.

13. A gyroscope comprising:
a resonator;
a plurality of transducers configured to drive a vibrational mode in the resonator and detect vibrations of the resonator;
a base configured to support the resonator, the base including attachment points;
a vibration isolator for isolating the resonator from the external system, the vibration isolator being formed from an elastomer and being located radially inward of the attachment points; and
rods which pass through the base and pass through openings in the resonator, the rods being configured to carry electrical signals to and from the transducers,
wherein the vibration isolator is a ring of a trapezoidal cross-section, such that the trapezoidal cross-section of the vibration isolator widens in a direction downward from the transducers, and
wherein the trapezoidal cross-section of the vibration isolator abuts a portion of the base that is frusto-conical, the portion of the base narrowing in the direction downward from the transducers.

14. A gyroscope comprising:
a resonator;

a plurality of transducers configured to drive a vibrational mode in the resonator and detect vibrations of the resonator;

a base supporting the resonator, the base including attachment points;

an elastomeric ring for isolating the resonator from external vibrations, the elastomeric ring located radially inward of the attachment points; and rods that carry electrical signals to and from the transducers, the rods passing through the base and through openings in the resonator, wherein the elastomeric ring has a trapezoidal cross-section that widens in a direction radially outward from a center axis of the resonator, and wherein the trapezoidal cross-section of the elastomeric ring abuts a portion of the base that is frusto-conical in shape, the portion of the base narrowing in the direction radially outward from the center axis of the resonator.

* * * * *